March 1, 1960 K. GEBELE 2,926,581
PHOTOGRAPHIC CAMERA AND INTERCHANGEABLE SHUTTER STRUCTURE
Filed Aug. 30, 1956 2 Sheets-Sheet 1

March 1, 1960 K. GEBELE 2,926,581
PHOTOGRAPHIC CAMERA AND INTERCHANGEABLE SHUTTER STRUCTURE
Filed Aug. 30, 1956 2 Sheets-Sheet 2

United States Patent Office 2,926,581
Patented Mar. 1, 1960

2,926,581

PHOTOGRAPHIC CAMERA AND INTER-CHANGEABLE SHUTTER STRUCTURE

Kurt Gebele, Munich, Germany, assignor, by mesne assignments, to Compur-Werk Friedrich Deckel OHG., Munich, Germany, a Germany firm Application August 30, 1956, Serial No. 607,218

Claims priority, application Germany September 9, 1955

3 Claims. (Cl. 95—53)

This invention relates to a photographic camera having an interchangeable shutter, especially a shutter of the kind which is tensioned and released by operating mechanism permanently mounted on the camera body, and which can be placed on and removed from the camera only when the parts of the shutter and the shutter operating parts on the camera body are in a predetermined similar condition, e.g., in tensioned condition.

An object of the invention is the provision of a generally improved and more satisfactory camera and shutter construction of the kind above mentioned.

Another object of the invention is the provision of simple and inexpensive mechanism for locking the operating parts on the camera to prevent a change in the predetermined or given condition of such parts while the shutter is removed from the camera.

Still another object is the provision of such locking mechanism so designed as to be automatically unlocked or rendered inoperative by the act of placing the shutter in proper operative position on the camera.

A further object is the provision of locking parts for the above mentioned purposes so designed and constructed that said locking parts serve also to lock the shutter against accidental loosening or displacement from the camera.

These and other desirable objects may be attained in the manner disclosed as an illustrative embodiment of the invention in the following description and in the accompanying drawings forming a part hereof, in which.

The same reference numerals throughout the several views indicate the same parts.

Figure 1:
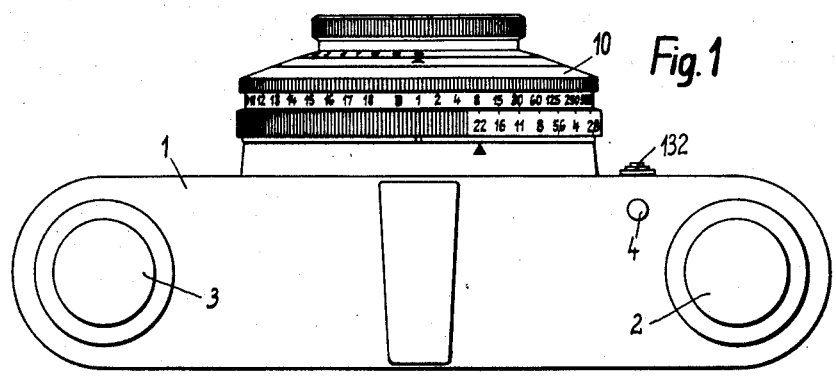
Fig. 1 is a top plan view of a camera and interchangeable shutter in accordance with one embodiment of the present invention.

In Fig. 1 there is shown a camera having a main body 1, equipped with a film advancing knob 2, a film rewinding knob 3, and a body release or push plunger 4. On the front of the camera body 1 there is detachably and replaceably arranged an interchangeable objective shutter 10.

The camera and the shutter may have any suitable construction of interengaging parts for securing them detachably to each other, the details of such interengaging parts being immaterial so far as the present invention is concerned. Merely as a convenient example of one possible construction of such details, the shutter 10 may have a rear threaded tube or lens tube 12, on which a bayonet ring 28 is fixedly held by a nut 30. The ring 28 carries three radially projecting bayonet lugs 32 spaced circumferentially at intervals around the ring 28, which bayonet lugs may be inserted in the usual fashion in the bayonet slots 44 of a mating bayonet ring 42 fastened by screws 40 to the front wall of the camera body 1. The attachment of the shutter 10 to the camera body 1 is effected by moving the shutter axially toward the camera while the bayonet lugs 32 on the shutter are alined with the bayonet slots 44 on the camera. When the lugs have been inserted fully through the slots, the entire shutter is turned a fraction of a revolution until one of the lugs 32 comes into contact with a stop pin 54 within the bayonet ring 42. When the shutter is to be detached from the camera, it is taken off by a reverse operation.

Figure 2:
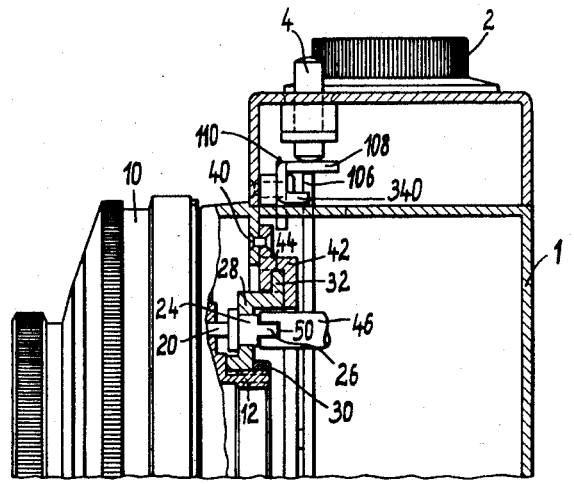
Fig. 2 is a view partly in side elevation and partly in vertical section through the construction shown in Fig. 1.

The internal mechanism of the shutter itself may be of any suitable known form of construction in which the shutter is tensioned and released from operating parts mounted on the camera body, preferably arranged so that the shutter is automatically tensioned or cocked by the operation of winding the film. The details, both of the shutter itself and of the operating parts on the camera, may be varied widely without departing from the invention. For example, such details may be in the form disclosed in the U.S. patent application of Kurt Gebele, Serial No. 514,218, filed June 9, 1955 (issued on August 25, 1959, as Patent 2,900,885), or the U.S. patent application of Kurt Gebele, Serial No. 520,875, filed July 8, 1955 (issued on August 25, 1959, as Patent No. 2,900,886). Thus the shutter may include, e.g., a shaft 20 (Fig. 2) arranged parallel to and offset from the optical axis and extending out the back of the shutter and fixed to a coupling member 24 having a diametrically extending coupling tooth 26 at its rear end to engage detachably with a diametrical notch 50 in the front end of an alined operating shaft 46 mounted in the camera body, these parts 20, 24, 26, 46, and 50 corresponding to the parts bearing the same respective numerals in said application No. 514,218. Only when the tooth 26 and notch 50 extend tangentally or circumferentially, can the tooth slip into or out of the notch when the shutter is being turned to attach it to or remove it from the camera.

When the shaft 46 is turned in one direction (preferably by the action of turning the film winding or advancing knob) the shutter is tensioned or cooked. When the shaft 46 is turned in the opposite direction (by the action of a suitable spring when unlatched or triggered by pushing downwardly on the release plunger 4) the shutter is operated to make an exposure.

In the preferred form of the invention, as here illustrated, the tangential position of the tooth 26 and notch 50 corresponds to the tensioned or cocked condition of the shutter. It will be realized, therefore, that the shutter can be rotated to remove it from or attach it to the camera, only when the shutter is in this tensioned or cocked condition, and it will be appreciated that while the shutter is removed, the shaft 46 of the camera should not be turned, for such turning would place the notch 50 in a non-tangential position, which would interfere with proper placing of the shutter on the camera again.

Figure 3:
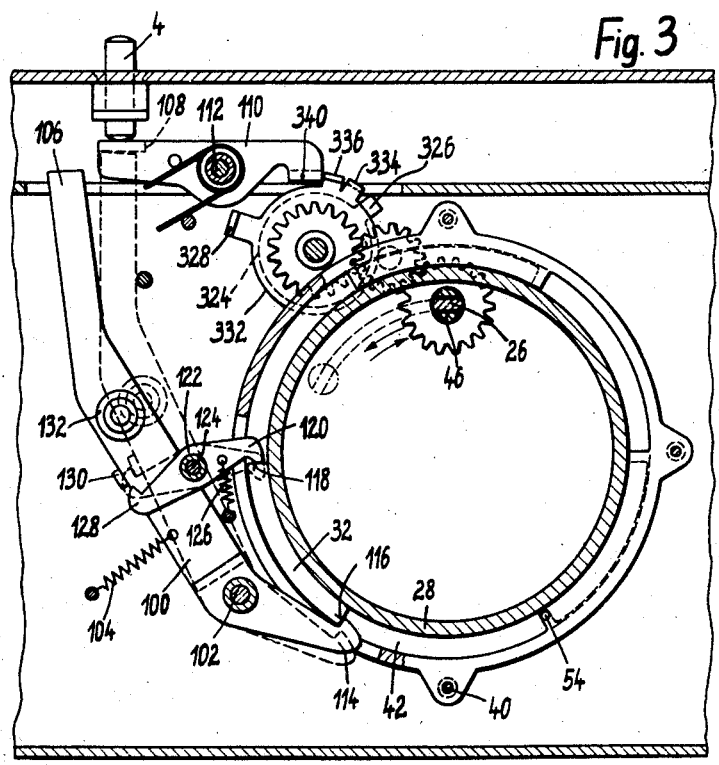
Fig. 3 is a vertical section taken transversely to the optical axis of the shutter, looking rearwardly, showing the locking mechanism according to a first embodiment of the invention.

The present invention provides interlocking mechanism to prevent depressing the release plunger 4 while the shutter is being removed and until the same or a different shutter is fully attached to the camera. In the preferred form (Fig. 3) this interlocking mechanism comprises a double armed locking lever 100 mounted within the camera body 1, swingable in a plane perpendicular to the optical axis on a fixed pivot 102 and biased by a spring 104 tending to swing the lever counterclockwise when viewed from the front. When the lever 100 is swung clockwise against the force of its spring 104, from the full line position to the dotted line position shown in Fig. 3, the upper end 106 of this lever comes beneath and blocks downward movement of a lug 108 formed on the left end (viewed from the front as in Fig. 3) of the release lever 110 spring biased in a clockwise direction on its pivot 112 and actuated by the release plunger or pushbutton 4.

The other or lower arm of the lever 100 terminates in a hook-shaped latching nose 114 which extends through an opening in the bayonet ring 42 in position to engage one end or shoulder or abutment edge 116 of one of the bayonet lugs 32 on the shutter, to latch the shutter against being turned counter-clockwise to disengage it from the camera body. As the shutter is placed on the camera and turned clockwise to engage it fully, the other end or shoulder 118 of the same bayonet lug 32 hits against one end 120 of a double armed latching pawl 122 pivoted on a stationary pivot 124 and biased in a clockwise direction by the spring 126. The opposite end of the pawl or lever 122 has a hook-shaped latching nose 128 in position to engage and hold a lug 130 on the lever 100 when the latter is in its effective locking position shown in dotted lines.

As already intimated, the mechanism for turning the shaft 46 in a shutter tensioning direction by the operation of the film winding knob 2 and the mechanism for turning the shaft in a shutter releasing or exposure making direction upon actuation of the release plunger 4 and release lever 110, may take various forms, examples of which are disclosed in the above mentioned copending patent applications, and the details of which are unimportant for purposes of the present invention. It is sufficient for present purposes to say that there may be, for example, a driving disk 324 operatively connected to the film winding knob to be turned thereby, and having a driving tooth 326 for engaging and turning a locking disk 332 which is operatively connected by gearing to the shaft 46 and which is provided with various lugs 328, 334, and 336, certain of which lugs cooperate with a lug 340 on the release lever 110 in a manner to cause or allow exposure-making rotation of the disk 332 and shaft 46 when the release plunger or trigger 4 is depressed to swing the release lever 110 in a counterclockwise direction. The structure above described provides a completely fool-proof interlock preventing undesirable operation of the camera while the shutter is removed, and insuring that the necessary condition of the operating parts, for proper removal and replacement of the shutter, is not altered while the shutter is absent from the camera. The tooth 26 and its cooperating notch 50 together form an interlock preventing the shutter from being removed from the camera except when the parts are in the tensioned condition. Even then, the shutter cannot become loose or be removed accidentally, because it is latched by the nose 114. In order to remove the shutter, it is necessary not only to have it in tensioned condition, but also to move the locking lever 100 from the full line position to the dotted line position in Fig. 3, which is done by manipulating the finger piece 132 which is fixed to the lever 100 and extends forwardly through a suitable arcuate slot in the front wall of the camera body, to an accessible external position.

When the lever 100 has been moved to the dotted line position, the latching nose 114 releases the shoulder 116 and the operator may now turn the entire shutter counter-clockwise, to disengage the bayonet connection and permit complete removal of the shutter. As soon as the shutter begins its counterclockwise rotation, the shoulder 118 moves in a direction away from the latching lever 120, 122, so that the spring 126 swings this lever to engage the lug 130 on the lever 100 and hold the latter in the dotted line position, blocking the lever 110 and preventing downward movement of the shutter release plunger 4. Since the release plunger cannot be depressed, the camera parts must remain in the tensioned condition until a shutter is replaced on the camera body.

During the engagement of the shutter, the clockwise turning thereof will cause the shoulder 118 to contact with the lever 120, 122 and release the lug 130. At approximately the same time, and just as the final part of the rotary motion is completed, the shoulder 116 comes to a position no longer interfering with the nose 114, so the spring 104 may now swing the lever 100 back from the dotted line position to the full line position, thus unblocking the release lever 110 and rendering the shutter operating parts on the camera body fully operative, and simultaneously latching the shutter in its fully mounted position to prevent any counterclockwise turning thereof until the lever 100 is displaced once more by pressure on the finger piece 132. A particularly advantageous structure is thus achieved, performing a plurality of functions with just a few simple and inexpensive additional parts.

Figure 4:
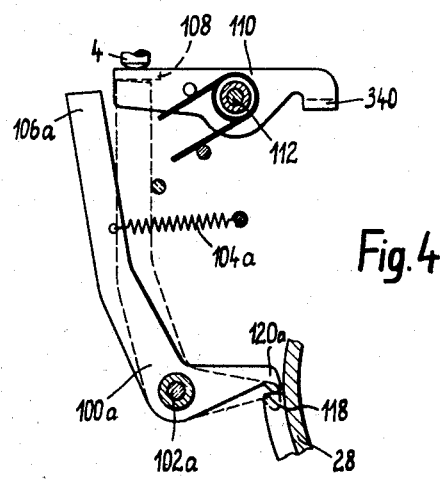
Fig. 4 is a view similar to a fragment of Fig. 3, illustrating a modified form or second embodiment of the invention.

A second embodiment of the invention, constituting a somewhat simpler construction, is illustrated in Fig. 4. In this second embodiment, all parts except the levers 100 and 122 and their operating springs are identical with the respective parts in the first embodiment, and are identified by the same reference numerals used in the first embodiment, no further description of such identical parts being needed.

In place of the lever 100, there is a lever 100a mounted on the stationary pivot 102a and urged by the spring 104a in a clockwise direction from the full line position of Fig. 4 toward the dotted line position. In the latter position, the upper end 106a of the lever blocks downward movement of the left end of the release lever 110 and thus prevents downward movement of the shutter release plunger 4. The other end 120a of the lever 100a lies in the path of travel of the shoulder 118 on the bayonet lug 32 of the interchangeable shutter 10, and is engaged by such shoulder so as to move the lever 100a from the dotted line position to the full line position, at the end of the clockwise turning movement of the shutter when it is being placed on the camera. Thus the counterclockwise turning of the shutter to remove it from the camera serves to withdraw the shoulder 118 from the end 120a of the locking lever 100a, allowing the spring 104a to move the lever to locking position, and the clockwise turning of the shutter when replacing it on the camera serves to unlock the locking lever. Hence the locking lever does not have to be actuated by hand, as was necessary in the first embodiment.

Both embodiments of the invention serve to lock and maintain the shutter-operating parts on the camera body, in the necessary condition or position for removal and replacement of the shutter, so long as the shutter is absent from the camera. Such condition or position, in the specific examples shown is the tensioned or cocked condition as distinguished from the released or run-down condition, but it will be apparent to those skilled in the art that the invention in its broader aspects is not limited to locking the parts in such tensioned condition, and is applicable equally well to locking the parts in a released or run-down condition if this happens to be the proper condition for removal and replacement of the particular type of shutter used.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. The combination of a photographic camera body, a detachable shutter removable from and replaceable on said body; a shutter release member movably mounted on said body, and interlocking means for locking said release member against releasing movement when said shutter is removed from said body, said interlocking means being moved to unlocking position by replacement of said shutter on said body, said interlocking means including a locking lever which is spring biased to an unlocking position, means for moving said lever to a locking position, a latch for holding said lever in locking position, cooperating parts on said locking lever and said shutter for preventing removal of said shutter from said body except when said locking lever is in its locking position, and cooperating parts on said latch and said shutter for releasing said latch by replacement movement of said shutter onto said camera body, so that the spring bias of said locking lever may then move said lever to unlocking position.

2. The combination of a photographic camera body, a detachable shutter removable from and replaceable on said body, a shutter release member movably mounted on said body, bayonet lugs carried by said shutter and bayonet slots carried by said body for interengagement for removably securing said shutter to said body, a locking lever pivoted to said body and movable between a locked position engaging said shutter release member to prevent movement to a releasing position and an unlocked position out of engagement with said shutter release member, spring means for biasing said locking lever toward said unlocked position, means for moving said locking lever to said locked position, said locking lever having a nose portion releasably engaged with one of said bayonet lugs when in said unlocked position to prevent removing movement of said shutter, a latch pivoted to said body, said latch having a nose portion engaging said locking lever when in said locked position and having an opposite end portion to be abutted by said one of said bayonet lugs when replacing said shutter on said body, thereby releasing said latch to allow said locking lever to move to said unlocked position under actuation of said spring means.

3. A construction as defined in claim 2 wherein said means for moving said locking lever to said locked position is manually operated.

References Cited in the file of this patent

UNITED STATES PATENTS 1,893,327    Howell _____ Jan. 3, 1933

FOREIGN PATENTS 1,064,773    France _____ Dec. 30, 1953
935,882    Germany _____ Dec. 1, 1955